April 7, 1970     J. A. DAVIS, JR., ET AL     3,504,744
PRODUCTION OF CRUDE OIL USING MICELLAR DISPERSIONS
Filed July 15, 1968
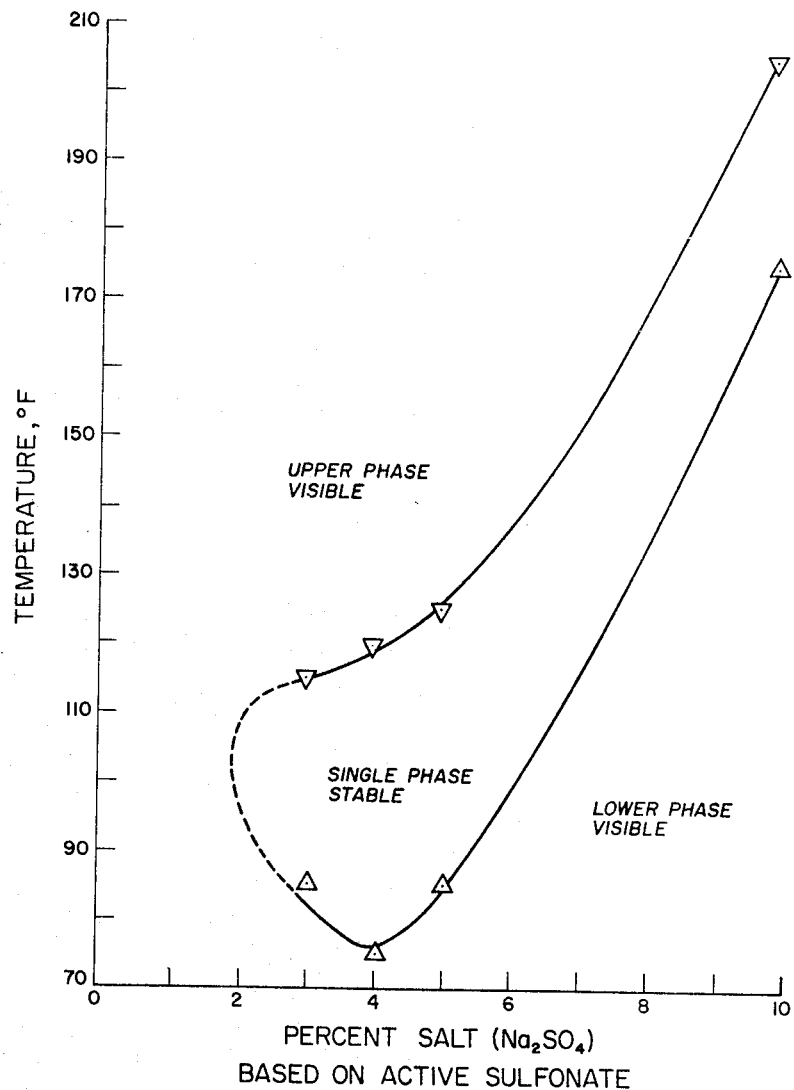
INVENTORS
JOHN A. DAVIS, JR.
WILLIAM J. KUNZMAN
BY
ATTORNEY United States Patent Office 3,504,744
Patented Apr. 7, 1970

3,504,744
PRODUCTION OF CRUDE OIL USING
MICELLAR DISPERSIONS
John A. Davis, Jr., and William J. Kunzman, Littleton, Colo., assignors to Marathon Oil Company, Findlay, Ohio, a corporation of Ohio
Continuation-in-part of application Ser. No. 514,477, Dec. 17, 1965. This application July 15, 1968, Ser. No. 748,897
Int. Cl. E21b 43/16, 43/22
U.S. Cl. 166—252     23 Claims

ABSTRACT OF THE DISCLOSURE

Crude oil from oil-bearing subterranean formations having a temperature in excess of about 80° F. is recoverable by adding to a stabilizable mixture of micellar dispersion constituents an amount of an ionic additive effective to stabilize the mixture at the temperature of the formation, injecting the stabilized micellar dispersion into the formation and displacing it through the formation to recover crude oil from a production means in fluid communication with the reservoir.

CROSS REFERENCE TO RELATED APPLICATION

This is a continuation-in-part of our copending U.S. patent application Ser. No. 514,477, filed Dec. 17, 1965, and now abandoned.

BACKGROUND OF THE INVENTION

Previously, there has been little or no need for micellar dispersions which remain stable for long periods of time at high temperatures. Micellar dispersions, particularly oil-external, have been found to be effective flooding materials in secondary and tertiary oil recovery. Since there are reservoirs at great depth and high temperature, there is a definite need for micellar dispersions stable at high temperatures.

Small amounts of salts are known to enhance the stability of emulsion systems while larger amounts of salts are known to break both water-external and oil-external emulsion systems. Small amounts of acids and bases have also been used in preparation of emulsions through large amounts of these materials are detrimental to emulsion stability. We have now discovered that the inclusion of salts, acids and/or bases, in oil-external and water-external micellar dispersions provide one inexpensive means for shifting the thermostability of the dispersion to higher temperatures. These additives are hereinafter termed "ionic additives." Further, the amounts of ionic additives required to effect stability in a given micellar dispersion at high temperatures may form an emulsion at lower temperatures.

The term "thermostability" as used herein means thermodynamically stable, i.e. a system below or above the thermostability temperature range will exhibit two or more distinct layers or phases, indicating an unstable system or an emulsion.

DESCRIPTION OF THE DRAWING

This effect is graphically demonstrated in the attached drawing, which shows the effect of salt on the temperature stability of a microemulsion made up of 55.9% kerosene, 10.6% sulfonate surfactant, 3.5% isopropanol, and 30% water, the percents based on volume. The commercial sulfonate contains 62% active surfactant. As indicated in the attached figure, a microemulsion made up of 4%, by weight, sodium sulfate (based on active sulfonate surfactant) is unstable when maintained below 75° F., i.e. a water-like phase separates. Once the fluid is heated over 75° F., it becomes a single phase and is stable until the temperature reaches about 120° F. Above this temperature, the fluid separates and a hydrocarbon-like upper phase forms. The same phenomena is observed if 10% salt is used, except that, at this concentration, the temperature range over which the microemulsion is stable is from about 170 to about 200° F. In testing both of the above compositions, the microemulsion was maintained at pressures above the bubble point of the components of the system.

DESCRIPTION OF THE INVENTION

The term "micellar dispersion" as used herein is meant to include micellar solutions, microemulsions, transparent emulsions, and micellar dispersion technology taught by C. G. Sumner, Clayton's, The Theory of Emulsions and Their Technical Treatment, 5th ed., pp. 315–320 (1954). Micellar dispersions differ from emulsions in many ways, the strongest differentiation being that the former are thermodynamically stable whereas the latter are not. Also, the micellar dispersions are generally transparent whereas emulsions are opaque.

In addition, the phase equilibrium of the micellar dispersion tends toward the finest possible dispersed phase rather than coalescence, as characteristic of emulsions.

Micellar dispersions of this invention are either water-external or oil-external. Both are useful in the recovery of crude oil. In certain reservoirs, the oil-external micellar dispersion is preferred as the flooding medium.

The micellar dispersion is composed essentially of hydrocarbon, aqueous medium, surfactant(s) sufficient to impart thermodynamic stability to the solution, optionally cosurfactant, and ionic additives defined herein. Example of volume amounts includes from about 1% to about 60% or more of hydrocarbon, less than about 20% to about 95% aqueous medium, at least about 4% surfactant, from about 0.01% to about 20% cosurfactant, and sufficient ionic additive to stabilize the micellar dispersion at the temperature of the formation. In addition, the dispersion and/or subsequent slugs used in the flooding process can contain corrosion inhibiting agents, bactericides, etc.

Hydrocarbons useful with the micellar dispersion include crude oil (both sweet and sour) partially refined fractions thereof, and refined fractions thereof. Specific examples include side cuts from crude columns, crude column overheads, gas oils, kerosenes, heavy naphthas, naphthas, straight-run gasoline, liquefied petroleum gases. Halogenated hydrocarbons are also useful.

The aqueous medium can be soft, brackish, or a brine. Preferably the water is soft, but it can contain small amounts of salts which are compatible with the ions in the subterranean formation being flooded.

The surfactant can be cationic, anionic or nonionic. Useful surfactants include oil-soluble surfactants which may be partially water-soluble or, alternately, mixtures of oil-soluble surfactants and water-soluble surfactants. Examples of such surfactants include sodium glyceryl monolaurate sulfate, dihexyl sodium succinate, hexadecyl-naphthalene sulfonate, diethyleneglycol, sulfate, glycerol disulfoacetate monomyristate, p-toluidene sulfate laurate, p-chloroaniline sulfate laurate, sodium sulfato oleylethyl-anilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by Du Pont Chemical Corporation, Wilmington, Del.), Energetic W-100 (a polyoxyethylene alkyl phenol marketed by Armour Chemical Company, Chicago, Ill.), Triton X-100 (a 50% active dodecyl trimethyl ammonium chloride marketed by Armour Chemical Company, Chicago, Ill.), and like materials. Preferably, the surfactant is a monovalent cation containing petroleum sulfonate or mixtures of petroleum sulfonates having an average molecular weight within the range of from about 360 to about 520, and more preferably 420–470. Mixtures of high and low molecular weight sulfonates are desirable with a particular micellar dispersion.

The cosurfactant, also identified as a semi-polar organic compound and as cosolubilizer, can be an alcohol, amino compound, ester, aldehyde, and ketone containing from about 1 to about 20 or more carbon atoms and more preferably from about 3 to about 16 carbon atoms. The cosurfactant is preferably an alcohol, e.g. isopropanol, n- and iso-butanol, the amyl alcohols, such as n-amyl alcohol, 1- and 2-hexanol, 1- and 2-octanol, decyl alcohols, alkaryl alcohols such as p-nonyl phenol and alcohol liquors such as fusel oil. Mixtures of two or more cosurfactants are useful in the micellar dispersions.

A variety of ionic additives impart the desired shift in the thermostability range. It appears that the salt concentration needed decreases as the valence of the ions making up the ionic additives increases. The solubility and ionization constant of the additive in the solution, the concentration of surfactant and cosurfactant in solution, the type of surfactant and cosurfactant in solution, and the type of hydrocarbon all also affect, to some extent, the amount of ionic additive required to effect stability over a given temperature range. The required additive concentration for a particular temperature range can be readily determined by maintaining a given partially stable emulsion or mixture of emulsion components at various temperatures within the desired temperature range and slowly incrementally stirring into the mixture a desired additive until stability is achieved.

Many water soluble inorganic salts can be used to accomplish the desired stabilizing effect, but the alkali metal salts of strong acids are preferred. Included within this preferred group are sodium sulfate, sodium chloride, sodium nitrate, potassium nitrate, and potassium sulfate. The alkali metal salts of hydrochloric and sulfuric acids are particularly preferred. Among the acids used in the process are included nitric acid, acetic acid, hydrochloric acid, hydrobromic acid, sulfuric acid, citric acid, propionic acid, boric acid, phosphoric acid, etc. Preferred acids include sulfuric acid, hydrochloric acid, nitric acid, phosphoric acid, and acetic acid. Alkali metal hydroxides are preferred, particularly sodium hydroxide, though other bases such as ammonia are operative.

A colloidal chemist having knowledge of the desired temperature stability range can routinely adapt the use of particular salts to a particular mixture of micellar dispersion contituents for use in this invention. Generally the micellar dispersion constituents will be stabilized for use at temperatures greater than about 80° F. and preferably above about 100–125° F. and most preferably above about 150° F.

The following examples are presented to teach specific embodiments of the invention. It is not intended that the specific compositions, procedures, or salts utilized limit the scope of the invention. Rather, it is intended that all equivalents obvious to those skilled in the art be included within the scope of the invention as defined in the appended claims and specification. Unless otherwise specified, all percents are based on volume.

EXAMPLE 1

The effect of sodium sulfate on the stability of an oil-external microemulsion made up of 40% water; 33.6% propane; 15% kerosene; 8.4% commercial sulfonate (62% active sodium sulfonate manufactured by Shell Oil Company); 3.0% isopropanol and sodium sulfate as indicated below:

| $Na_2SO_4$ concentration (as p.p.m. in water) | Lower limit of temp. stability ° F. | Upper limit of temp. stability, ° F. |
|---|---|---|
| 5,250 | 75 | 85 |
| 7,875 | 79 | 130 |
| 10,500 | 86 | 132 |

EXAMPLE 2

The effect of salt on a microemulsion containing 47.5% kerosene; 8.4% straight-run gasoline; 30.0% water; 10.6% sulfonate surfactant; 3.5% isopropyl alcohol, and salt, as indicated, is as follows:

| $Na_2SO_4$ concentration (as p.p.m. in water) | Lower limit of temp. stability ° F. | Upper limit of temp. stability, ° F. |
|---|---|---|
| 6,570 | <70 | 97 |
| 13,140 | 100 | 125 |
| 19,710 | 125 | 170 |

EXAMPLE 3

The effect of sodium sulfate salt on a number of kerosene-straight-run gasoline microemulsions is indicated in the table below. The microemulsions contain 55.9% hydrocarbon; 30.0% water; 10.6% commercial sulfonate; 3.5% isopropyl alcohol and sodium sulfate, as indicated.

| Hydrocarbon, Percent kerosene | $Na_2SO_4$ concentration (as p.p.m. in water) | Lower limit of temp. stability, ° F. | Upper limit of temp. stability, ° F. |
|---|---|---|---|
| 95 | 6,570 | <70 | 93 |
| 95 | 13,140 | <70 | 114 |
| 95 | 19,710 | 118 | 140 |
| 85 | 6,670 | <70 | 97 |
| 85 | 13,140 | 100 | 125 |
| 85 | 19,710 | 125 | 170 |
| 70 | 6,670 | <70 | 125 |
| 70 | 13,140 | 130 | 160 |
| 70 | 19,710 | 140 | 165 |
| 50 | 6,570 | 95 | 133 |
| 50 | 13,140 | 150 | >215 |
| 50 | 19,710 | | |
| 25 | 6,570 | 103 | 163 |
| 25 | 13,140 | 160 | >220 |
| 25 | 19,710 | | |

EXAMPLE 4

The effect of salt on oil-external micellar dispersions made from a soluble oil containing 79.8% kerosene; 15.2% commercial sulfonate surfactant; and 5% isopropanol is indicated in the following table:

| Percent water in slug | $Na_2SO_4$ concentration (as p.p.m. in water) | Lower limit of temp. stability, ° F. | Upper limit of temp. stability, ° F. |
|---|---|---|---|
| 7.5 | 34,800 | | >160 |
| 10.0 | 25,600 | | 55 |
| 20.7 | 10,800 | | 87 |
| 30.0 | 6,600 | | 118 |
| 45.0 | 3,450 | | >170 |
| 10.0 | 51,200 | | >170 |
| 15.0 | 32,000 | | 170 |
| 17.5 | 26,700 | 87 | 120 |
| 20.0 | 22,600 | 80 | 113 |
| 25.0 | 17,000 | 87 | 119 |
| 35.0 | 10,500 | 90 | 130 |
| 45.0 | 6,900 | | 160 |
| 10.0 | 76,800 | | >170 |
| 20.0 | 33,900 | 137 | >180 |
| 25.0 | 25,500 | 85 | 160 |
| 30.0 | 19,800 | 110 | 146 |
| 35.0 | 15,750 | 90 | 135 |
| 40.0 | 12,700 | 108 | 140–145 |
| 45.0 | 10,350 | 103 | 160 |
| 50.0 | 8,500 | 100 | 170 |
| 55.0 | 6,950 | 77 | >170 |

This example indicates that optimum salt concentrations can be readily determined, through routine means, for particular microemulsion stability at a desired temperature.

EXAMPLE 5

The table below indicates the effect of salt on a microemulsion made from 67.2% kerosene; 20.0% water; and 12.8% Arquade 2C-75 (75% active dicoco-dimethylammonium chloride surfactant manufactured by Armour & Company).

| $Na_2SO_4$ concentration (as p.p.m. in water) | Lower limit of temp. stability, °F. | Upper limit of temp. stability, °F. |
|---|---|---|
| 2,000 | 60 | 155 |
| 3,000 | 55 | 169 |
| 4,000 | 59 | 194 |

EXAMPLE 6

A microemulsion made up of 30% water, 55.9% kerosene, 3.5% isopropanol, and 10.6% Shell commercial monosulfonate surfactant is found to be stable at a 1% sodium hydroxide (weight percent based on weight of active sulfonate which is 62% of commercial material) concentration between 65 and 100° F. At 2% sodium hydroxide concentration, the microemulsion is stable between 100 and 130° F. The microemulsion is stable from 128 to 165° F. at 3% sodium hydroxide concentration.

EXAMPLE 7

A microemulsion is made up of 63.7% kerosene, 20.4% water, 12.4% Shell commercial monosulfonate surfactant, and 3.5% isopropanol. The microemulsion is stable at the temperatures corresponding to the sulfuric acid concentrations (as weight percent of the pure sulfonate) in the below table:

| Sulfuric acid concentration | Lower limit of temp. stability, °F. | Upper limit of temp. stability, °F. |
|---|---|---|
| 0.162 | 62 | 116 |
| 0.325 | 99 | 200 |

EXAMPLE 8

Three water-external micellar dispersions are obtained by mixing the components indicated in the following table; stability of the dispersions are also indicated in this table:

| Component | Percent of component within micellar dispersion | | |
|---|---|---|---|
| | A | B | C |
| Ammonium petroleum sulfonate (average MW=about 420-445, about 63% active sulfonate) | 11.49 | 11.49 | 11.49 |
| Hydrocarbon distillate | 18.36 | 18.36 | 18.36 |
| Water: | | | |
| (1) Henry plant water [1] | 13.93 | 41.79 | 69.65 |
| (2) Palestine water [2] | 55.72 | 27.86 | 0.0 |
| Primary amyl alcohol | 0.5 | 0.5 | 0.5 |
| $Na_2SO_4$ (p.p.m.) | 4,000 | 12,000 | 20,000 |
| Thermal stability temperature range (°F.): | | | |
| (1) Lower temperature limit | 50 | 64 | 75 |
| (2) Upper temperature limit | 79 | 102 | 123 |

[1] Henry plant water=water obtained from the Henry lease in Illinois, example of an analysis is 17,210 p.p.m. of total dissolved solids and having a pH of about 7.7.
[2] Palestine water=water obtained from the Palestine water reservoir in Palestine, Illinois, example of an analysis is 412 p.p.m. of total dissolved solids and having a pH of about 7.6-8.0.

What is claimed is:

1. In a process for recovering crude oil from an oil-bearing subterranean formation having at least one production means in fluid communication with at least one injection means, comprising determining the temperature of the formation, injecting into the formation a micellar dispersion having sufficient amount of ionic additive incorporated therein to stabilize the mixture of micellar dispersion constituents at the formation temperature and displacing the micellar dispersion through the formation to recover crude oil through the production means.

2. The process of claim 1 wherein the mixture of micellar dispersion constituents contains hydrocarbon, surfactant, and aqueous medium.

3. The process of claim 2 wherein the mixture of micellar dispersion constituents contains cosurfactant.

4. The process of claim 1 wherein the formation temperature is in excess of about 80° F.

5. The process of claim 1 wherein the formation temperature is in excess of about 100-125° F.

6. The process of claim 1 wherein the formation temperature is in excess of about 150° F.

7. The process of claim 1 wherein the formation temperature is in excess of about 200° F.

8. The process of claim 1 wherein the ionic additive is selected from the group consisting of mineral acids, alkaline hydroxides, and water-soluble inorganic salts.

9. The process of claim 1 wherein the ionic additive is a water-soluble inorganic salt.

10. The process of claim 1 wherein the surfactant is a petroleum sulfonate.

11. A process of recovering crude oil from an oil-bearing subterranean formation having at least one production means and at least one injection means therein comprising determining the temperature of the formation to be flooded to be in excess of about 80° F., adding to a mixture of micellar dispersion constituents an amount of an ionic additive effective to stabilize the mixture at the temperature of the formation, injecting the stabilized micellar dispersion into the formation to displace fluids in the formation toward said production means, and recovering crude oil through the production means.

12. The process of claim 11 wherein the formation temperature is in excess of about 100-125° F.

13. The process of claim 11 wherein the formation temperature is in excess of about 150° F.

14. The process of claim 11 wherein the formation temperature is in excess of about 200° F.

15. The process of claim 11 wherein the micellar dispersion in an oil-external microemulsion.

16. The process of claim 11 wherein the ionic additive is selected from the group consisting of mineral acids, alkaline hydroxides, and water-soluble inorganic salts.

17. The process of claim 11 wherein the ionic additive is a water-soluble inorganic salt.

18. A process of stabilizing a micellar dispersion for use at temperatures in excess of about 80° F. comprising adding to a stabilizable mixture of micellar dispersion constituents an amount of ionic additive sufficient to stabilize the mixture at the temperature in excess of about 80° F.

19. The process of claim 18 wherein the temperature is in excess of about 100°-125° F.

20. The process of claim 18 wherein the temperature is in excess of about 150° F.

21. The process of claim 18 wherein the ionic additive is selected from the group consisting of mineral acids, alkaline hydroxides, and water-soluble inorganic salts.

22. The process of claim 18 wherein the mixture of micellar dispersion constituents contains hydrocarbon, petroleum sulfonate, cosurfactant, and water.

23. The process of claim 22 wherein the cosurfactant is an alcohol.

References Cited

UNITED STATES PATENTS

| | | | |
|---|---|---|---|
| 2,994,660 | 8/1961 | Reddie et al. | 252—8.5 |
| 3,006,845 | 10/1961 | Van Dyke et al. | 252—8.5 |
| 3,170,514 | 2/1965 | Harvey et al. | 166—9 |
| 3,297,084 | 1/1967 | Gogarty et al. | 166—9 |
| 3,330,343 | 7/1967 | Tosch et al. | 166—9 |
| 3,330,344 | 7/1967 | Reisberg | 166—9 |
| 3,348,611 | 10/1967 | Reisberg | 166—9 |

STEPHEN J. NOVOSAD, Primary Examiner

U.S. Cl. X.R.

166—274, 275

PO-1050
(5/69)

UNITED STATES PATENT OFFICE
CERTIFICATE OF CORRECTION

Patent No. 3,504,744      Dated 4/7/70

Inventor(s) John A. Davis, Jr. and William J. Kunzman

It is certified that error appears in the above-identified patent and that said Letters Patent are hereby corrected as shown below:

Column 1, line 46:     Delete "through" and insert --though--.

Column 5, line 69:     Add -- < -- before "50" in Table.

Claim 15, line 2:     Delete "in" and insert therefor --is--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents